United States Patent Office 3,496,195
Patented Feb. 17, 1970

3,496,195
D-o-BROMO-PHENYL-ISOPROPYL-METHYL-
PROPINYLAMINE AND ITS SALTS
Zoltán Ecsery, Ildikó Kosa, József Knoll, and Éva
Somfai, Budapest, Hungary, assignors to Chinoin
Gyogyszer-es Vegyeszeti Termekek Gyara RT.,
Budapest, Hungary
No Drawing. Filed May 11, 1966, Ser. No. 549,171
Int. Cl. C07c 87/28, 91/00
U.S. Cl. 260—343.7          1 Claim

ABSTRACT OF THE DISCLOSURE

Optically active phenyl isopropylamine derivative useful as MAO inhibiting agents, antidepression agents and metabolism increasing agents.

---

This invention is concerned with new optically active phenyl-isopropylamine derivatives and methods for their preparation, moreover with their preparation, moreover with their finishing in the form of pharmaceutical compositions.

It has been found that the new optically active compounds of the general formula:

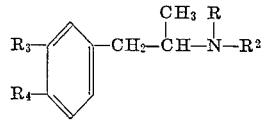

(I)

and acid addition salts thereof (wherein R stands for a lower alkyl group, $R^2$ stands for a propyl, propenyl or propinyl group which may be substituted by a hydroxy group or a halogen atom if desired or if $R^3$ and/or $R^4$ does not represent hydrogen, $R^2$ may also stand for hydrogen, $R^3$ and $R^4$ stands for hydrogen, halogen, or a nitro, amino or diazonium group) may be used advantageously in therapy as antidepressive, metabolism-increasing, MAO-inhibiting agents, etc.

R in the Formula I stands for a lower alkyl group, having 1 to 5 carbon atoms, such as methyl, ethyl, n-propyl, isobutyl, etc.

Particularly advantageous representatives of the compounds according to the present invention are the following derivatives: L-phenyl-isopropyl-methyl-propinylamine, D-phenyl-isopropyl-methyl propinylamine, L-phenyl-isopropyl-N-methyl-2-bromo - propenylamine, D-phenyl-isopropyl-N-methyl - 2 - bromo - propenylamine, D-p-nitrophenyl-isopropyl-methylamine, D-o-nitro - phenyl - isopropyl-methylamine, D-o-amino-phenyl - isopropyl-methylamine, D-o-bromo-phenyl-isopropyl-methylamine and D-o-bromo-phenyl-isopropyl-methyl - propinylamine and their acid addition salts.

According to a further feature of the present invention there is provided a process for the preparation of the new optically active compounds of the general Formula I which comprises (a) reacting optically active compounds of the general formula

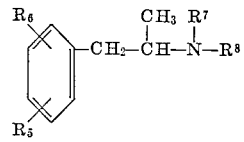

(II)

wherein:

$R^7$ stands for hydrogen or has the same meaning as substituent $R^8$ stands for hydrogen or has the same meaning as substituent $R^2$ $R^5$ stands for hydrogen or has the same meaning as substituent $R^3$ $R^6$ stands for hydrogen or has the same meaning as substituent $R^4$ if $R^7$ and/or $R^8$ stands for hydrogen with compounds of the general formula

$$X\text{—}R^9 \quad (III)$$

and/or the general formula

$$X\text{—}R^{10} \quad (IV)$$

wherein:

$R^9$ stands for a group which is identical with R or may be transformed into same, $R^{10}$ stands for a group which is identical with $R^2$ or may be transformed into same, X represents a reactive group which may be removed on reaction with amines, or (b) condensing optically active compounds of the general formula

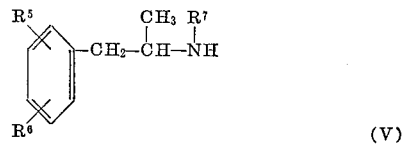

(V)

(wherein $R^5$, $R^6$ and $R^7$ have the same meaning as stated above) with formaldehyde and acetylene, or (c) separating the diastereomeric antipodes of racemic compounds of the general formula

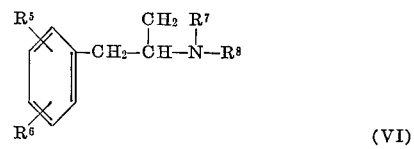

(VI)

prepared according to method (a) or (b) said antipodes formed with optically active resolving agents, if desired transforming substituents $R^5$, $R^6$, $R^9$ and/or $R^{10}$ into substituents R, $R^2$, $R^3$ and/or $R^4$ in the compounds of the general Formula VI, converting the compounds thus obtained into their salts formed with mineral acids or organic acids if desired or setting free the bases from their acid addition salts and/or finishing the compounds thus obtained or their acid addition salts if desired in forms ready for direct medical use.

According to method (a) compounds of the general Formula II are reacted with compounds which are suitable for the substitution of the amino group or for the introduction of further substituents into said amino group. As starting material optically active compounds of the general Formula II are used, which may be prepared by resolution of the racemic compound with optically active acids by methods known per se [C.A. 14, 745 (1920)].

Further substituents may be introduced into the optically active compounds of the Formula II according to methods disclosed in Hungarian Patent 151,090.

Propargyl and 2-halogeno-propenyl radicals may be introduced by reacting the optically active amide preferably with an alkyl halogenide, alkyl sulfonate, p-methylphenyl-sulfonate, etc. The reaction may be carried out by heating the reaction mixture at a temperature in the range of 20 to 120° C. The reaction may be accomplished preferably in the presence of a solvent which does not contain hydroxy groups. If the reaction is carried out by using an excess of the amine, said components acts as acid binding agent. Other bases may also be used as acid-binding agent. The reaction mixture may be worked up preferably by extracting all the amine-components by adding a diluted acid and separating same from the compounds insoluble in the acid. The acidic aqueous solution is then made alkaline and the organic bases insoluble in water are thus precipitated.

When a tertiary base is prepared from a secondary one, the product may be separated from the non-alkylated secondary base by acylating the reaction mixture with an acid chloride or an acid anhydride and dissolving the tertiary base from beside the acylated secondary base with a diluted acid. The diluted acidic extract is then made alkaline and the base thus set free may be purified by distillation and/or crystallization of a salt thereof. One may also proceed by separating the secondary and tertiary bases obtained by means of fractional distillation of the base or crystallization of the salts.

According to a further form of realization of our process the optically active amine is reacted with the corresponding aldehyde and is subjected to reduction. The reduction may be carried out simultaneously with the condensation or subsequently; advantageously with nascent hydrogen or complex metalhydrides. Nascent hydrogen may be developed preferably with the aid of activated aluminium in aqueous ethanol as medium. One may also proceed by using an alkaline or acidic medium and forming hydrogen preferably with metals or alloys soluble in bases. The above method is particularly suitable for the preparation of compounds wherein the corresponding aldehyde required is easily available. Thus acetaldehyde, propionylaldehyde, propargyl aldehyde etc. may be advantageously used for this purpose.

According to method (b) of the process of the present invention optically active compounds of the general Formula V are condensed with formaldehyde and acetylene. The optically active amine is then dissolved in ethers having high boiling points (such as butyl ether, dioxane), whereupon gaseous acetylene is led through the solution in the presence of a copper compound. It is preferred to apply 1.5 to 3 moles of paraformaldehyde and 0.05–0.1 moles of the copper compound, calculated on 1 mole of the optically active amine. Cuprous acetylide or other cuprous salts such as cuprous chloride may be used as copper compound. The reaction may be carried out by heating the mixture at a temperature in the range of 50 to 110° C.

According to method (c) of our process the diastereoisomeric antipodes of racemic compounds of the general Formula I or VI formed with optically active resolving agents are separated. The process may be advantageously carried out by reacting the amine to be resolved with optically active acids by methods known per se and separating the diastereoisomeric antipodes thus obtained on the basis of the different physical properties of the antipodes, preferably by crystallization. The "method known per se" may be varied by using the appropriate solvent and resolving agent, depending on the substituent of the amine. Thus optically active acids, such as camphor sulfonic acid, bromo camphor sulfonic acid, tartaric acid, dibenzoyl tartaric acid or other known resolving agents may be used.

If compounds of the general Formula VI are resolved, the optically active products thus obtained are subjected to further chemical reactions. Thus unsaturated bonds may be formed in radicals $R^7$ and $R^8$ by splitting of hydrogen halogenide from the corresponding halogeno substituted alkyl derivative or splitting off water from the corresponding hydroxy-substituted derivative. Accordingly the alkyl derivatives may be prepared from the corresponding halogeno or hydroxy substituted alkenyl derivatives. Hydrogen halogenides may be split off by means of basic reactants, such as alkali hydroxides or alkaline earth hydroxides. The product thus obtained may be purified by distillation of the free base or crystallization of the salts.

Compounds containing double or triple bonds may be saturated by means of catalytic hydrogenation or transformed into halogenated (chloro, bromo) derivatives by reacting same with hydrohalogenic acids or halogens if desired. Compounds containing hydroxy groups may be converted into the corresponding halogeno derivatives by interaction with halogenating agents.

The unsaturated bonds may be saturated preferably by means of catalytic hydrogenation, in the presence of a palladium or Raney-nickel catalyst. If palladium catalyst is used, it is preferred to apply the starting material in the form of a mineral acid addition salt thereof. Hydrogenation may be carried out preferably in the presence of a polar solvent, e.g., ethanol and it may be accomplished partially or completely.

Groups $R^5$ and $R^6$ in the compounds of the general Formula VI may be optionally transformed into group $R^3$ or $R^4$ if desired. Derivatives bearing nitro-substituents on the aromatic ring may be prepared e.g., by nitrating phenyl-isopropylamines unsubstituted in their aromatic ring. The reaction may be carried out preferably by dissolving the amine in a 50–100% sulfuric acid under cooling; adding dropwise nitric acid to the solution thus obtained and subjecting the reaction mixture to a 1–24 hours post-reaction. The mixture is then poured into water or on ice-water and is made alkaline.

The precipitated oily phase is separated and the aqueous layer is extracted with a solvent if necessary. The water and solvent content of the nitro-phenyl-isopropylamines thus obtained is removed and the product is purified by distillation and/or crystallization of the salts of same. If the base is solid, the crystallization of the base may also be used as purifying step.

The p- and o-nitro-isomers formed by nitration may be separated e.g. by distillation of the crude nitro-phenyl-isopropyl-amine mixture. The non-nitrated phenyl-isopropyl-amine is recovered as forerun, the main-fraction consists of a mixture of the p- and o-nitro-phenyl-isopropylamines. One may proceed preferably by converting the main fraction to the hydrochloric acid salts, whereupon the p-nitro-phenyl-isopropylamine hydrochloride precipitates in the form of crystals due to the slighter solubility thereof, while the o-isomer remains in the mother-lye. The o-nitro-phenyl-isopropyl-amine may be recovered from the mother-liquor e.g. by setting the base free and subjecting same to fractional distillation. If no hydrochloride being crystallizable from ethanol containing hydrochloric acid is obtained from the fraction, it may be considered as the o-isomer.

One may also proceed by preparing such salts from the crystallization mother-lye of the p-nitro-phenyl-isopropylamine hydrochloride which enable the crystallization of the o-nitro-isomer. The oxalates, tartarates and 3,5-dinitrobenzoates are suitable salts for this purpose. The o-nitroisomer is crystallized and purified in the form of a salt.

The p- and o-nitro-phenyl-isopropylamines thus obtained may be converted into the corresponding aminophenyl-isopropylamines by reduction, which may be carried out preferably by catalytic hydrogenation. Other known reducing methods, such as reduction with nascent hydrogen (iron+hydrochloric acid, zinc+hydrochloric acid), ferrous chloride stannous chloride, sodium sulfide may be used as well.

Catalytic hydrogenation may be accomplished by hydrogenating the salt of the nitro compound in a solvent in the presence of a catalyst (palladium, platinum, nickel) with gaseous hydrogen. After the reaction having been completed, the catalyst is filtered off and the amino compound is isolated by evaporation in the form of a salt, or the base may also be set free. The base may be purified by distillation or crystallization or by crystallizing a salt thereof.

If pure p- or o-nitro-phenyl-isopropylamines are used as starting material, the corresponding pure p- or o-aminoisomers are obtained.

One may also proceed by hydrogenating the crude nitrophenyl-isopropylamine and separating the amino-phenyl-isopropylamines by crystallization of distillation, e.g. on the basis of the low solubility of the p-amino-phenyl-isopropylamine hydrochloride in ethanol. The o-isomer may then be purified by crystallization of the salt of same formed with 3,5-dinitro-benzoic acid.

The halogeno-derivatives may be prepared by dissolving the amino-phenyl isopropylamine in a mineral acid and diazotizing same with sodium nitrite at a temperature below 10° C., whereupon the desired halogeno-phenyl-isopropylamine is prepared in the presence of the corresponding halogenide anion and preferably a cuprous salt. The product may be isolated e.g. by making the reaction mixture alkaline and separating and/or extracting the precipitated oily base. On evaporating the solvent the crude base is obtained which may be purified by distillation or by crystallization of the base or salts of same.

The halogeno derivatives may also be prepared by halogenating the phenyl-isopropyl-alkylamines unsubstituted on their aromatic ring. The reaction may be carried out preferably with halogens, in the presence of catalysts such as iron aluminium, ferric chloride aluminium chloride, zinc chloride or bromide. The reaction may be carried out in the presence of a solvent or without same. It is preferable to use solvents being inert in halogenation reactions, e.g. carbon tetrachloride or nitrobenzene.

The compounds prepared according to any method of the process according to the present invention may be converted into pharmaceutically acceptable acid addition salts or the base may be set free from their salts. Salt-formation may be accomplished by using mineral acids (such as hydrochloric acid, sulfuric acid, phosphoric acid) or organic acids (such as aliphatic acids, maleic acid, lactic acid, citric acid, ascorbic acid, etc.).

Accordng to a still further feature of the present invention it has been found that the compounds according to the present invention or the acid addition salts of same may be transformed into pharmaceutical compositions suitable for direct medical use. The compositions may be finished in the form of tablets, coated pills, pills, suppositories, capsules, solutions, powder mixtures, emulsions or injections, optionally after addtion of addtives, sliding and filling agents, carriers. The compositions are suitable for oral or parenteral administration, and may contain further, pharmaceutically active components (analgetics, blood-pressure decreasing agents, sedatives, antiinflammatory agents, diuretics, coronary-flow increasing agents, spasmolytics, etc.) if desired. Tablets comprising 20–100 mg. amounts of the active ingredient of the general Formula I may be used advantageously in human therapy.

It has been found that the pharmacological effects of the racemic compounds are advantageously differentiated by the optically active compounds of the present invention. Thus the MAO-inhibiting effect of D-phenyl-isopropyl-methyl-propinylamine is smaller while its acute, central nerval system exciting and motility increasing effect is stronger than that of the racemic compound. On the other hand the L-antipode does not exhibit any acute, central nerval system increasing effect, but it possesses significantly stronger MAO-inhibiting properties. The L-antipode inhibits the spasm-limit-reducing effect of reserpine in a greater extent than the D-antipode. The D-antipode exerts a noradrenalin-level-decreasing effect, while the L-antipode does not. Both antipodes reduce blood-pressure and increase metabolism of the same order. The D-antipode raises however the body-temperature, while the L-antipode does not exhibit such effect.

Further details of our process are to be found in the examples.

EXAMPLES (1) 50 g. of L-phenyl-isopropyl-methylamine are dissolved in 62.5 ml. of toluene, whereupon 13 ml. of propargyl bromide are added dropwise within about 20 minutes at a temperature in the range of 50 to 60° C. The reaction mixture is stirred at 80° C. for 3 hours, whereupon it is cooled and the toluene solution is extracted with 125 ml. of a 5% hydrochloric acid solution. The acidic layer is separated and made alkaline. The precipitated oil is isolated, washed with benzene and evaporated. The residue is subjected to fractional crystallization in vacuo. L-phenyl-isopropyl-methylamine distills off at 65–67° C. [0.6 Hg mm. $n_D^{20}$=1.5083. The L-phenyl-isopropyl-methyl-propinylamine is obtained at 92–93° C.] 0.8 Hg mm. $n_D^{20}$=1.5180. The melting point of the hydrochloride amounts to 141° C.; $(\alpha)_D^{20}$=—11.2.

*Analysis.*—C=15.53% (calc.: 15.6%), N=5.98% calc.: 6.2%).

Pharmacological tests carried out with the hydrochlorides and compared with the effect of the D-antipode prepared according to Example 2 are summarized below:

Toxicity was determined in mice and rats and was evaluated according to Litchfield and Wilcoxon. The compounds were administered subcutaneously and the perish of animals was observed for 24 hours. The toxicity on mice was determined individually and parallel with it in groups. For the determination of the individual toxicity one mouse was put into a fruit bottle with a basic ground of 200 square centimetres and similarly seven of them in the course of the determination of the groups. The DL-, D- and L-isomers were compared as well as the $LD_{50}$ values of DL-aktedron. The results obtained in mice are shown in Table I.

TABLE I

The toxicity of D-, L-, DL-isomers and that of DL-aktedron in mice.

| Compound | $LD_{50}$ mg./kg. | | Individual index/Index of groups |
|---|---|---|---|
| | Individual | In groups | |
| Compound D | 58.5 | 30.5 | 1.92 |
| Compound L | 123.0 | 121.0 | 1.03 |
| Compound DL | 120.0 | 90.0 | 1.33 |
| Aktedron DL | 25.1 | 8.8 | 2.9 |

The values of toxicity in rats are as follows:

| | Values of $LD_{50}$ mg./kg. | | |
|---|---|---|---|
| | D-antipode | L-antipode | DL-isomer |
| Route of administration: | | | |
| S.c | 208 | 280 | 218 |
| I.v | 72.5 | 81 | 75 |

It can be seen from Table I, that in the case of groups the D-isomer had, just as aktedron, a more toxic effect while the L-isomer did not prove to be toxic. Thus the essential difference between the D- and L-isomers concerning acute hypermotilitic and psychostimulant activity becomes evident; i.e. the L-isomer does not possess such an effect but the D-isomer. It is well known that the characteristic increase of group-toxicity is due to the hypermotilitic psychostimulant activity.

Motility was estimated in mice by means of a motimeter. Each group consisted of 20 animals. The drugs were administered subcutaneously; the measuring was 30 min. The data obtained are presented in Table II.

TABLE II

The changes of the values of motility (percent) as compared to that of the controls.

| | D-isomer | L-isomer | DL-aktedron |
|---|---|---|---|
| Dose, mg./kg.: | | | |
| 2 | 57 | 68 | |
| 5 | −69 | −89 | +187 |
| 10 | −48 | −87 | |
| 30 | +108 | −20 | |

It is clear from the data that till the order of 30 mg./kg. inclusive the L-isomer does not increase motility but to the contrary it decreases definitely the spontaneous motility. Small doses of the D-isomer also decrease motility, greater doses on the other hand cause a significant increase of it.

In our experiments both the D- and L-isomers had the same efficiency as psychoenergizers. The two compounds were investigated in a dose of 5 mg./kg. in a series of two chronic experiments in two different periods and a complete antagonism with treatment of reserpine could be observed. From the point of view of the psychoenergetic effect the D- and L-isomers and the racemic form, respectively, did not show any difference.

The metabolic activity of the compound was investigated by means of Issekutz's method. The experiments were performed under urethane anesthesia; the animals 0.7 mg./kg. were given intraperitoneally. According to our preliminary studies the racemic compound possessed the ⅙ part of the effect of aktedron.

The metabolism increasing effect of the D-isomer, L-isomer, DL-isomer, DL-aktedron and phenmetrazine was compared in different doses. The $LD_{50}$ values were calculated according to Litchfield and Wilcoxon. The values are presented in Table III.

TABLE III

Metabolism increasing effect of the L- and DL-isomer as compared to that of DL-aktedron and phenmetrazine.

| | Compound | The $ED_{50}$ value of metabolism increasing effect, mg./kg. | Index |
|---|---|---|---|
| No. of experiments: | | | |
| 1 | DL-aktedron | 1.62 | 1.0 |
| 2 | Phenmetrazine | 10.1 | 0.16 |
| 3 | D-antipode | 10.0 | 0.16 |
| 4 | L-antipode | 10.9 | 0.15 |
| 5 | DL-antipode | 10.6 | 0.15 |

It is shown by the data that in the aspect of metabolism increasing effect it does not exist any difference between the D- and L-isomers both of them possessing the ⅙ part of that of aktedron and being in the same order with that of phenmetrazine.

The level of epinephrine was determined in the brain of rats with the aid of biological titration. The level is according to the data of literature depressed acutely by aktedron. The changes in the level of epinephrin were measured after the administration of the D-, L-, DL- isomers and DL-aktedron. The results obtained are presented in Table IV.

TABLE IV

| No. of experiments | Compound | Dose, mg./kg. | Time after administration of compound, hours | Level of epinephrine of brain in/µg./g. (counted on wet weight) |
|---|---|---|---|---|
| 1 | Control | | | 0.308 |
| 2 | D-antipode | 25 | 1 | 0.190 |
| 3 | do | 25 | 24 | 0.260 |
| 4 | do | 25 | 1 | 0.350 |
| 5 | do | 25 | 24 | 0.420 |
| 6 | DL-antipode | 25 | 1 | 0.210 |
| 7 | do | 25 | 24 | 0.366 |
| 8 | DL-aketedron | 25 | 1 | 0.180 |

It is clear from the table that the effect on the decreasing of the level of epinephrine is present only in the motility increasing D-isomer, while the L-isomer does not have any effect. Thus the D-isomer is in this respect accordingly also similar to aktedron.

MAO activity was estimated by means of a manometric method with the measuring of the oxygen consumption of rat brain and liver hemogenisate—and considering the linkage of the enzyme chiefly to mitochondrial structure —in mitochondrial preparations.

The reaction mixture contained as final concentration 10 ml. of thyramine, 67 mM. $PO_4$ buffer of pH 7.3, 1 mM. of KCN and mM. of semicarbazide. The measurings were performed in $O_2$ atmosphere at 37.5 C. for an hour—reading it in every 10 min.—while activity remained linear. For each bottle in the case of homogenisate the quantity equivalent to 100 mg. of tissue and in the case of mitochondrium the quantity equivalent to 100 mg. of protein was employed. The concentration of saccharose employed for the preparation of mitochondrium was 0.25 M.

The MAO inhibiting effect of D- and L-isomer during the in vitro experiments in the case of different concentrations of the compound can be seen from Table V.

TABLE V

| Tissue | Isomer | Concentration M | | | | | | | |
|---|---|---|---|---|---|---|---|---|---|
| | | $10^{-8}$ | $10^{-7}$ | $10^{-6}$ | $5.10^{-6}$ | $10^{-5}$ | $10^{-4}$ | $10^{-3}$ | $10^{-2}$ |
| Brain | L- | 58.1 | 48.2 | 43.7 | [1]16.0 | 11.3 | 6.55 | 0.0 | 0.0 |
| | D- | 71.5 | 69.0 | 59.0 | 51.5 | 45.5 | 41.0 | [1]16.8 | 1.55 |
| Liver | L- | 68.0 | 46.0 | 35.6 | [1]14.1 | 3.82 | 1.62 | 0.0 | 0.0 |
| | D- | 75.5 | 86.0 | 48.0 | 43.5 | 33.8 | 28.7 | [1]12.4 | 1.69 |

[1] Hatching.

The effect of different concentrations of D- and L-isomers in the course of in vivo experiments are presented in Table VI. The MAO activity of mitochondrium was measured in every experiment 1 hour following subcutaneous administration. Activity is represented by the values in percent of the controls.

The rate of MAO activity expressed as the percent of controls.

TABLE VI

| | L-isomer | | D-isomer | |
|---|---|---|---|---|
| | Brain | Liver | Brain | Liver |
| Dose, mg./kg.: | | | | |
| 1.0 | 56.0 | 59.5 | | |
| 5.0 | 50.0 | 36.0 | | |
| 10.0 | 31.2 | 27.5 | 80.0 | 58.2 |
| 25.0 | 10.7 | 11.2 | 56.6 | 35.6 |
| 50.0 | | | 20.0 | 31.6 |
| 100.0 | | | 20.0 | 31.3 |

It is clear from Tables V and VI, that the L-isomer inhibits more strongly MAO activity than the D-isomer. If in in vitro experiments the L-isomer was given to the mitochondria, the enzyme activity of brain and liver could be practically inhibited already in a concentration of $5 \times 10^{-6}$, while an inhibition of such a degree can be reached only in a concentration of $10^{-3}$ of the D-isomer, i.e. in a 500 times greater concentration. (The respective values are emphasised by hatching.)

The same concentration could be observed also in the in vivo experiments. 10 mg./kg. of the L-isomer caused already a significant inhibition both in brain and liver, while the same effect could be reached only with a 5–10 fold quantity of the D-isomer.

MAO activity of the rat brain was determined after the daily administration of 5 mg./kg. of the L- and D-isomer for one month.

A cumulative effect developed under these conditions of administration and the MAO activity decreased in the case of L-isomer to 11.3% and in the case of the D-isomer to 21.3%

(2) The process described in Example 1 is carried out except that D-phenyl-isopropyl-methylamine is used as starting material. Thus D-phenyl-isopropyl-methyl-propinylamine is obtained, B.P. 97–100° C [1.0 Hg mm. $n_D^{20}$=1.5180. The melting point of the hydrochloride amounts to 131.5° C.,]$(\alpha)_D^{20}$=+11.5°.

*Analysis.*—Cl′=15.6% (calc.: 15.6%), N=6.05% (calc.: 6.2%).

(3) 10 g. of 1,3-dibromo-propane (0.1 mole) are added dropwise to 29.7 g. (0.2 moles) of L-phenyl-isopropyl-methylamine. The reaction-mixture is heated at 100° C. for 7 hours. The reaction mixture is cooled to room-temperature and dissolved in a 5% hydrochloric acid solution. The acidic solution is extracted twice with ether and made alkaline with a 40% sodium hydroxide solution whereupon an oil precipitates, which is separated from the aqueous layer. The aqueous phase is extracted with ether three times. The etheral extracts are united with the isolated oil and dried over anhydrous potassium carbonate, whereupon it is filtered or decanted and evaporated.

In order to benzoylate the nonreacted phenyl-isopropylmethylamine, 120 ml. of a 40% sodium hydroxide solution and 70 ml. of benzoyl chloride are poured into the residual brown oil while stirring. The two components are added simultaneously during 30 to 45 minutes while the temperature rises to 50–60° C. The reaction mixture is stirred at 50–60° C. for an hour and cooled to ambient temperature. Benzene is added, whereupon the aqueous and benzene layers are separated. The benzene phase is extracted with a 5% hydrochloric acid solution, whereupon the L-phenyl-isopropyl-N-methyl-2-bromo-propenylamine is dissolved into the aqueous hydrochloric acid phase and the N-benzoyl-phenyl-isopropyl methylamine remains in the benzene layer and may be isolated on evaporating the solvent. Phenyl-isopropylmethylamine may be recovered on heating with aqueous hydrochloric acid. The hydrochloric acid solution is then made alkaline and the precipitated phenyl-isopropyl-N-methyl-2-bromo propenylamine is extracted with benzene. The benzene solution is dried over potassium carbonate, evaporated and the residue is distilled off in vacuo. Thus L-phenyl-isopropyl-N-methyl-2-bromo-propenylamine is obtained, B.P.: 100–101°C./1 Hg mm.

10.9 g. of the product thus obtained are dissolved in 160 ml. of ethanol and 20 ml. of a 50% aqueous potassium hydroxide solution are added. The mixture is refluxed for 16 hours, the ethanol is then distilled off, whereupon water is added to the residue which is then extracted with benzene. The benzene solution is dried over potassium carbonate and evaporated, the residue is distilled off under reduced pressure. The main fraction obtained at 104–110° C./5 Hg mm. consists of L-phenyl-isopropyl-N-methyl-propinylamine, $n_D^{20.4}=1.5180$.

The base may be converted into its hyldrochloride with anhydrous ethanol containing hydrochloric acid. The salt may be crystallized from a mixture of ethanol and ether, M.P.: 141–141.5° C.

*Analysis.*—(percent) Calculated: C, 69.2 $(\alpha)_D^{20}=-10.9°$; H, 7.80; N, 6.05; Cl, 16.40. Found: C, 69.8; H, 7.66; N, 6.26; Cl, 16.30.

(4) 29.8 g. of D-phenyl-isopropyl-N-methylamine and 14 g. of propargylaldehyde are dissolved in 100 ml. of ethanol. 7 g. of finely milled aluminum-foils are washed with ethanol until free of fats, whereupon a solution of 2 g. of mercuric chloride and 30 g. of sodium chloride in 30 ml. of water is poured on the aluminium. The substance becomes warm, gas-formation starts. The solution is decanted after 6–8 minutes and the aluminium foils are washed thoroughly with water.

The aluminium thus obtained is added to the above solution under stirring and cooling so that the temperature should amount to 15–30° C. The reaction mixture is stirred for 24 hours, whereupon 60 ml. of a 40% sodium hydroxide solution are added and stirring is continued for an hour. The two layers formed are separated and the aqueous phase is extracted with benzene three times. The benzene extracts are united with the ethanolic solution and evaporated. An oily and an aqueous phase are formed, which are then separated and the aqueous layer is extracted with benzene. The benzene solutions are united with the oil, and dried over potassium carbonate. Benzene is evaporated and the residue is distilled off in vacuo. Thus D-phenylisopropyl-N-methyl-propinylamine is obtained as main fraction at 103–110° C./5; Hg mm.; $n_D^{20.4}=1.5175$. The hydrochloride melts at 141.5° C.; $(\alpha)_D^{20}=+10.9$.

(5) 28.7 g. of L-phenyl-isopropyl-N-methylamine are dissolved in 160 ml. of dioxane, whereupon 12 g. of paraformaldehyde and 2 g. of cuprous chloride are added. Gaseous acetylene is introduced under stirring, while the reaction mixture is heated at 80° C. for 30 hours. The reaction mixture is evaporated, the residue washed with water and the oil obtained subjected to fractional distillation in vacuo. Thus 10.1 g. of L-phenyl-isopropyl-N-methyl-propinylamine are obtained at 102–107° C./5 Hg mm.; $n_D^{20.4}=1.5182$. The melting point of the hydrochloric acid salt of the product amounts to 141° C.; $(\alpha)_D^{20}=-11.1$.

(6) 746 g. of D-phenyl-isopropylmethylamine are added to a mixture of 565 ml. of concentrated sulfuric acid and 250 ml. of water under cooling and stirring. 630 ml. of 100% nitric acid are added to the mixture at 35–40° C. while stirring. The reaction mixture is kept at 30° C. for 12 hours, whereupon it is poured on 2 kg. of ice. The acidic soltuion is extracted with benzene and made alkaline. The precipitated yellowish-brown oil is extracted with benzene and made alkaline. The precipitated yellowish-brown oil is extracted with benzene, the benzene layer obtained is dried over potassium carbonate and evaporated. The residue is distilled off in vacuo. The main fraction obtained at 128–130° C./0.4 Hg mm. consists of D-nitro-phenyl-isopropyl-methylamine and is a mixture of the para, ortho and meta isomers, refractive index $n_D^{20}=1.5477$.

The hydrochloride is prepared with ethanol containing hydrchloric acid and may be recrystallized from ethanol several times. Thus D-p-nitro-phenyl-isopropyl-methylamine hydrochloride is obtained, M.P.: 220–222° C., $(\alpha)_D^{20}=-4°$; c.=5 (in ethanol).

(7) The mother-lyes obtained by the preceding example are evaporated and the base is set free from the residue and is then fractionated on a Widmer-column. Thus D-o-nitro-phenyl-isopropyl-methylamine is obtained at 99–102° C./0.15 Hg mm. The product is dissolved in ethanol, the solution is acidified with ethanol containing hydrochloric acid and hydrogenerated in the presence of a palladium catalyst. Hydrogenation is carried out until no more hydrogen is adsorbed, whereupon the catalyst is filtered off, the filtrate is evaporated and the base is set free from the residue. The base thus obtained is distilled off in vacuo. Thus at 99–100° C./0.1 Hg mm. D-o-aminophenyl-isopropyl-methylamine is obtained. Refractive index: $n_D^{20}=1.5597$.

(8) 65.7 g. of D-o-amino-phenyl-isopropyl-methylamine are dissolved in a mixture of 193 ml. of a 50% hydrogen bromide solution and 361 ml. of water and is diazotized at 0–5° C. with a solution of 27.7 g. of sodium nitrite and 54 ml. of water while stirring.

A mixture of 72.2 g. of crystalline cupric sulfate, 649 ml. of water, 72.2 g. of potassium bromide, 265 ml. of a 50% hydrogen bromide solution and 28.9 g. of copper powder are heated on a water bath for an hour. The mixture is cooled whereupon the above mixture of the diazonium salt is added. The reaction mixture is allowed to stand for 60 minutes, whereupon it is heated on waterbath for an hour. The mixture is then cooled and made alkaline with ammonium hydroxide. The separating oil is extracted with benzene, the benzene layer is dried over anhydrous potassium carbonate and evaporated. The residue is distilled off in vacuo. Thus at 75–76° C./0.1 Hg mm. D-o-bromo-phenyl-isopropyl-methylamine is obtained. $n_D^{20}=1.5495$. The melting point of the hydrobromide amounts to 169–170° C. Analysis: Br'=25.47 (calc.: 25.85).

(9) 17.28 g. of D-o-bromo-phenyl-isopropyl-methylamine are dissolved in 34 ml. of anhydrous toluene, whereupon 42 ml. of triethylamine and 8.9 ml. of propargyl bromide are added within 2 hours in 4 portions. 50 ml. of a 20% sodium hydroxide solution are added, whereupon the layers are separated and the toluene phase is evaporated. The residue is treated with 9.56 g. of benzoyl chloride and 60 ml. of a 10% sodium hydroxide solution while stirring in order to benzoylate the nonreacted secondary base. The alkaline mixture is extracted with benzene whereupon the product is extracted from the benzene layer with a 5% hydrochloric acid solution. The acidic phase thus obtained is made alkaline and the separated oil is extracted with benzene. The benzene solution is dried over anhydrous potassium carbonate, dried and evaporated, whereupon the residue is distilled off under reduced pressure. The main fraction is obtained at 116–117° C./0.3 Hg mm.; $n_D^{20}$=1.5508. The D-o-bromo - phenyl-isopropyl-methyl-propinyl-amine hydrobromide thus obtained melts at 150–157° F. after recrystallization from ethyl-acetate containing 30% of ethanol.

*Analysis.*—(percent) C, 45.3 (calc.: 45); H, 5.1 (calc.: 4.92).

(10) 50 g. of L-phenyl-isopropyl-methyl-propinyl-amine hydrochloride are homogenised with 50 g. of lactose and converted into briquettes on a briquetting press. 3 g. of talcum and 1.5 g. of stearine are added to the briquettes which are then ground. The disintegrated substance is pressed into 1000 tablets on a tabletting press. The tablets thus obtained may be coated if desired.

What we claim is:

1. The optically active compound D-o-bromo-phenyl-isopropyl-methyl-propinylamine and its acid addition salts.

References Cited

UNITED STATES PATENTS

| | | |
|---|---|---|
| 3,198,834 | 8/1965 | Beregi et al. _____ 260—570.8 |
| 3,341,591 | 9/1967 | Schumann _____ 260—570.8 X |

FOREIGN PATENTS

| | | |
|---|---|---|
| 983,127 | 2/1965 | Great Britain. |
| 767,161 | 12/1951 | Germany. |
| 767,186 | 1/1952 | Germany. |
| 1,368,136 | 6/1964 | France. |
| 2,635 | 7/1964 | France. |

OTHER REFERENCES

Patrick et al., "Jour. Amer. Chem. Soc.," vol. 68, pp. 1153–55 (1946).

Knoll et al., "Arch. 1st. Pharmacodyn," vol. 155, pp. 154–64 (1965).

ROBERT V. HINES, Primary Examiner

U.S. Cl. X.R.

260—141; 501.1, 501.21, 570.8, 558; 524—330, 280